United States Patent [19]

Mabie

[11] 4,360,941
[45] Nov. 30, 1982

[54] ELECTRICALLY HEATED WINDSHIELD WIPER ASSEMBLY

[76] Inventor: Earl Mabie, 60 Sherwood Dr., Hooksett, N.H. 03106

[21] Appl. No.: 144,344

[22] Filed: Apr. 28, 1980

[51] Int. Cl.³ .............................................. B60S 1/04
[52] U.S. Cl. .............................. 15/250.06; 15/250.07; 15/250.42
[58] Field of Search ....................... 15/250.05–250.09, 15/250.3, 250.36, 250.42; 219/203

[56] References Cited

U.S. PATENT DOCUMENTS

| | | | |
|---|---|---|---|
| 2,727,271 | 12/1955 | Oishei et al. | 15/250.42 |
| 2,728,100 | 12/1955 | Oishei et al. | 15/250.42 |
| 2,869,166 | 1/1959 | Eaves | 15/250.07 |
| 3,619,556 | 11/1971 | Deibel | 15/250.07 |
| 4,027,354 | 6/1977 | Burpee | 15/250.3 |
| 4,152,808 | 5/1979 | Andregg | 15/250.07 |

FOREIGN PATENT DOCUMENTS

| | | | |
|---|---|---|---|
| 448512 | 5/1948 | Canada | 15/250.07 |
| 1906670 | 8/1970 | Fed. Rep. of Germany | 15/250.07 |
| 2807330 | 8/1979 | Fed. Rep. of Germany | 15/250.06 |

*Primary Examiner*—Peter Feldman
*Attorney, Agent, or Firm*—Pearson & Pearson

[57] ABSTRACT

A windshield wiper assembly for preventing freezing of the wiper blades, and blade supporting frames, of a vehicle, during a sleet storm, the blade and frame being enclosed in a weather protective hood. A first pair of electric conductors are each affixed along the outer wall of the hood and a second pair thereof are each affixed along the inner wall of the hood. The conductors heat the hood and frame, to prevent accumulation of ice, when selectively energized by a cable through the wiper slot to the vehicle battery, or, preferably, by a separate battery attached on the vehicle cowl, and independent of the vehicle electric system.

2 Claims, 5 Drawing Figures

ELECTRICALLY HEATED WINDSHIELD WIPER ASSEMBLY

BACKGROUND OF THE INVENTION

It has heretofore been proposed to provide a flexible wiper blade for vehicle windshields with a pressure distributing frame formed of multiple yokes of spring leaf material so that the blade will conform to the configuration of a curved windshield. It has also been proposed to provide a weather proof bonnet, or hood, enclosing the pressure distributing frame to protect it from ice, sleet, and snow during non use, as illustrated in U.S. Pat. Nos. 2,727,271 of Dec. 20, 1955 and 2,728,100 of Dec. 27, 1955 to Oishei.

Such bonneted wiper blades are commercially available as "Winter Wiper Blades", Stock Nk. ARL-18-2, W. B. 618 from Trico Products Corporation, Buffalo, New York 14203.

It has further been proposed to provide such a bonneted wiper blade with a single, flat strip-like electrical conductor extending along the base edge of the flexible wiper blade to provide heat for the distributing frame within the bonnet, as in U.S. Pat. No. 3,619,556 to Deibel of Nov. 9, 1971.

SUMMARY OF THE INVENTION

In this invention the base of the wiper blade and the flexible pressure distributing frame is enclosed in a weather proof hood, or bonnet, similar to that of the Deibel Patent above but instead of affixing a single electric resistance conductor along the base of the blade, a pair of such conductors are affixed along the inner wall of the hood and a second pair of such conductors are affixed along the outer wall of the hood. Thus, when a vehicle has been unused, and exposed to the elements for a considerable length of time, with a thick crust of ice formed on the exterior of the flexible hood, the energization of the two pairs of resistance conductors within the hood and along the inner face of the flexible walls thereof, quickly melts the ice and avoids fracture of the material of the hood.

The electric resistance conductors within the hood may be connected to a supply of electricity through the cigarette lighter socket on the dashboard or by a cable extending through the wiper slot down to the vehicle battery in the mtor compartment.

However, to avoid running down the battery when the vehicle is parked with the motor not operating, I prefer to provide a portable source of electricity independent of the vehicle electric system and usable in an emergency without draining the vehicle battery so that the vehicle won't start in a sleet storm.

A weather proof battery box is provided for one or more six volt dry batteries, of the type much used in flashlights, the box having one or more permanent magnets on the exterior so that it can be stored in the glove compartment, or trunk, and magnetically affixed on the metal of the cowl of the vehicle, outside the passenger compartment and between the conventional pair of wiper shafts. A male plug, on the end of a flexible cable running down the wiper arm on the driver's side, is detachably affixed in a female electric plug receptacle in the wall of the battery box to complete a circuit to the conductors within the wiper bonnet. The wiper on the passenger side may also be plugged into the box, if desired.

A fifth conductor of round cross section is embedded in the material of the wiper blade, or squeegee, and may be energized to heat the tapered wiping edge thereof, as part of the electric circuit.

DESCRIPTION OF A PREFERRED EMBODIMENT

Figure 1:
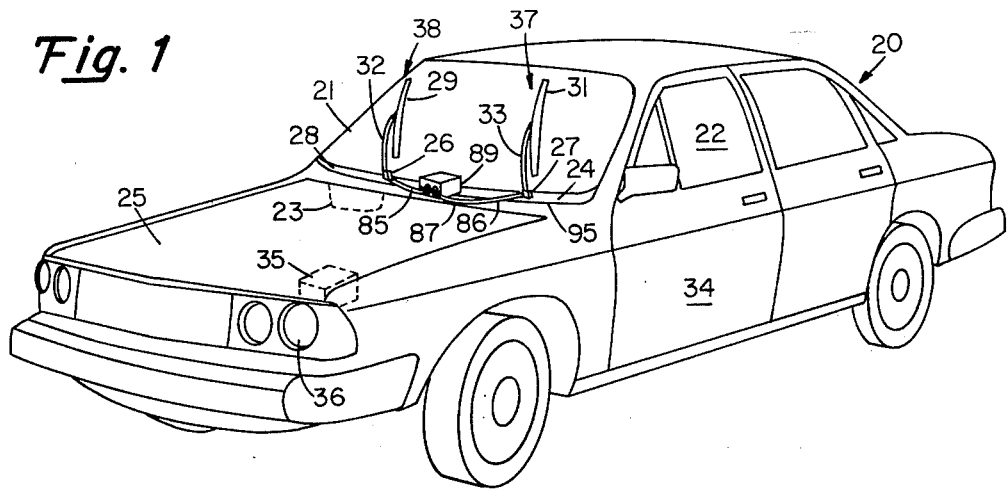
FIG. 1 is a front perspective view of a typical vehicle with the invention installed thereon.

As shown in the drawing, a typical vehicle 20, includes the windshield 21, usually of glass, passenger compartment 22, dashboard glove compartment 23, cowl 24, motor hood 25, windshield wiper drive shafts 26 and 27 and cowl slot 28 in which the wiper blades 29 and 31 and wiper blade actuating arms 32 and 33 are hidden during non-use. The cowl 24, hood 25, and the remainder of the sheet metal 34 of the vehicle is of magnetizable metal such as steel. The vehicle battery 35 powers the vehicle electric system 36 for the oscillating of the power shafts 26 and 27, for the ignition, lights, horn, etc. all in a well known manner.

Figure 2:
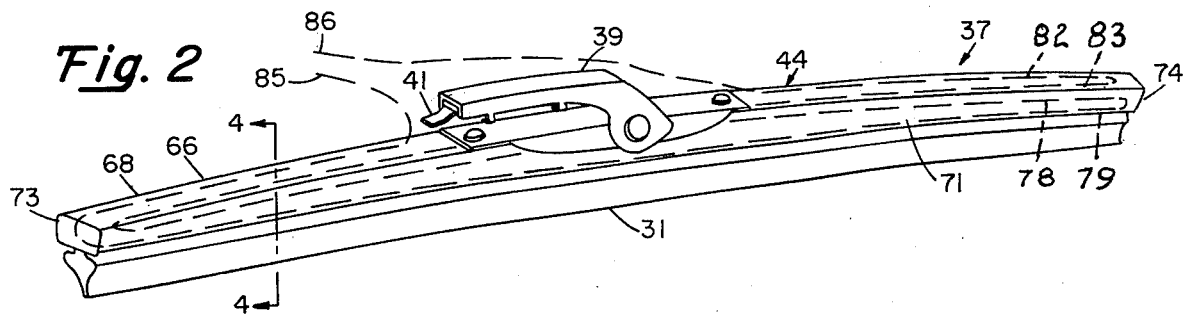
FIG. 2 is an enlarged, front, perspective view of the hooded wiper assembly of the invention with the conductors shown in heavy dotted lines.
Figure 3:
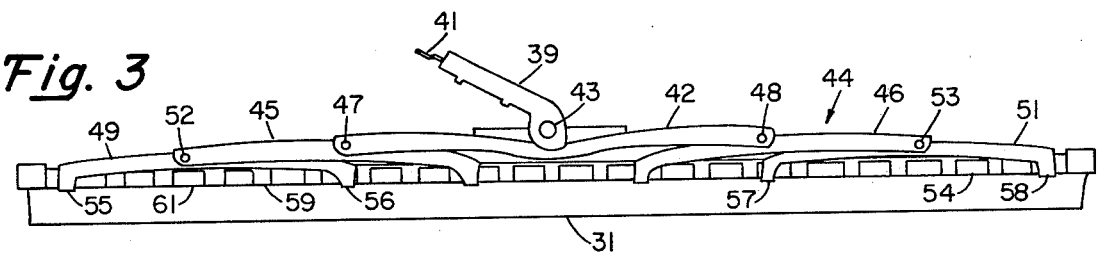
FIG. 3 is a view similar to FIG. 2, but with the hood broken away to show the pressure distributing frame.
Figure 4:
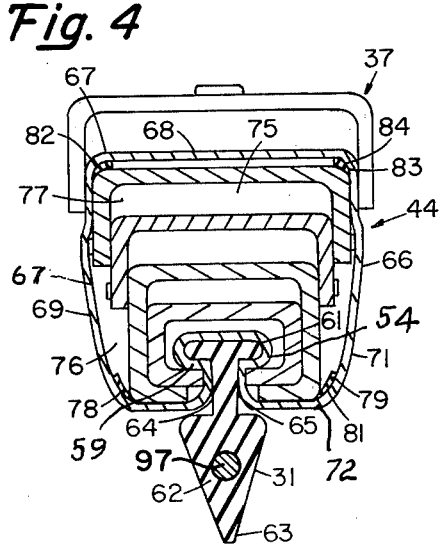
FIG. 4 is a further enlarged end elevation in section on line 4—4 of FIG. 2.
Figure 5:
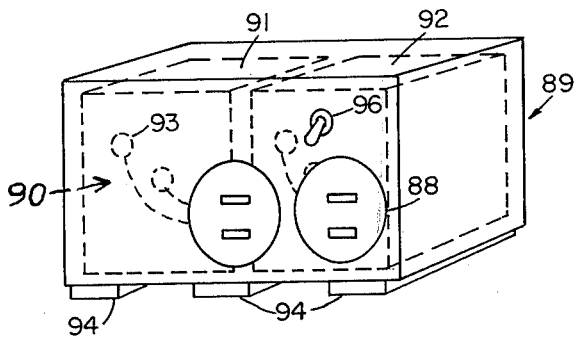
FIG. 5 is an enlarged perspective view of the battery box, magnet, and female plug socket of the invention.

In FIGS. 2, 3, and 4, one of the wiper blade assemblies 37 of the invention is shown, as carried on an arm 33 and including the wiper blade, or squeegee, 31. The other wiper blade assembly 38 carried on arm 32 and including blade 29 is identical therewith.

Each wiper blade assembly 37 or 38 includes an arm attaching clip 39 at the terminal end 41 of the oscillatory arm 33, there being a primary spring leaf yoke 42 pivoted at 43 thereto. Yoke 42 forms part of the pressure distributing frame 44, which enables the rubber-like, flexible, wiper blade 31 to conform to the curvature of the windshield with the requisite pressure.

Pressure distributing frame 44 also includes the secondary spring leaf yokes 45 and 46 pivoted to primary yoke 42 at 47 and 48. Frame 44 also includes tertiary spring leaf yokes 49 and 51, pivoted to secondary yokes 45 and 46 at 52 and 53 respectively and each connected to the flexible backing strip 54 at 55, 56, 57 and 58. The backing strip 54 is crimped as at 59 to the base edge 61, or anchoring bead, of the wiper blade 31.

As best shown in FIG. 4, each wiper blade, or squeegee, such as 31 includes a relatively thick body 62 having a tapered tip wiping edge 63 and a pair of opposite, longitudinally extending, grooves 64 and 65, the grooves being located between the enlarged base edge 61 and the relatively thick portion of the body 62.

A weather protective hood, or bonnet, 66, of thin rubber-like, or elastomeric, material, 67, and of generally rectangular cross section, encloses and seals the entire pressure distributing frame 44. The hood 66 has an outer wall 68, a pair of side walls 69 and 71, and an inner wall 72, the inner wall being split and each opposite side thereof sealed, and adhered, in the grooves 64 and 65 of the wiper blade. The end walls 73 and 74 of the hood are closed. For convenience of description the sealed chamber 75, within the hood, is divided into an inner portion 76 and an outer portion 77.

In accordance with the invention, a first pair of electric resistance conductors 78 and 79, extend along, and are affixed by adhesive 80 to, the inner wall 72 of the hood 66 in the inner portion 76 of chamber 75 thereof, each proximate one of the opposite longitudinally extending grooves 64 or 65 in the blade for heating the adjacent parts of the blade 31 and frame 44. A second pair of electric resistance conductors 82 and 83 extend along, and are affixed by adhesive 84 to the outer wall 68 of the hood 66 in the outer portion 77 of chamber 75, each proximate the outer parts of the frame 44 to heat the spring metal, pivots and crimps thereof while melting any accumulation of ice on the exterior of the hood 66 during non-use or during a sleet storm. The electric conductors 78, 79, 82 and 83 may each be grounded to the metal of frame 44 but preferably, they form part of a continuous, sinuous conductor as shown in dashed lines in FIG. 2, the terminal ends 85 and 86, running down the arm 33 to a male electric plug 87. The plug 87 may be of a type to fit the cigarette lighter, on the dashboard of the vehicle, or a suitable switch, and female plug receptacle 88 may be mounted between the wipers and connected by a cable through the conventional wiper slot 28 to the vehicle battery 35.

However, in order not to run down the vehicle battery 35, so that the vehicle may fail to start during or after a storm, I prefer to provide a sealed, weather proof battery box 89, containing one or more six volt dry batteries 91 or 92, the box 89 having the female plug receptacle 88 on the outside and connected to the battery terminals 93. The battery box 89 may be normally carried in the vehicle glove compartment 23, and it is provided with one or more strong permanent magnets 94, so that, when needed in a sleet storm, it can be magnetically attached to the magnetizable metal 95 of the cowl 24, between the wipers and both wipers plugged into the receptacle 88 to dislodge the ice.

The electric circuit, 96 thus includes the source of electricity 91 or 92, an on-off switch 96, the female receptacles 88, the male plugs 87, terminal ends 85 and 86 and the electric resistance conductors 78, 79, 81 and 82 and it is completely independent of the vehicle electric system.

A fifth, electric resistance conductor, 97, of round cross section, may be embedded in the body 62 of the wiper blades and included in the circuit 96 to heat the rubber-like material in the tapered tip 63 of the blade. The conductors 78, 79, 81 and 82 are preferably of flat, tape configuration. The battery box 89 can be attached to the lip of the cowl slot by suitable spring clips, but will remain in place due to the force of gravity and the magnetic force of magnets 94 on the cowl, the onrushing wind during travel tending to clamp it against the lower center of the windshield.

The device of the invention may be original equipment with each vehicle or it may be sold as a package for attachment and use, in the winter, the package consisting of a pair of hooded wiper assemblies 37 and 38, with their built-in resistance conductors, end terminals and male plugs together with a single magnetically attachable battery box with exterior female plug receptacle. The wiper assemblies 37 and 38 would remain in use all year around on the vehicle, and be electrically heated only when necessary.

I claim:

1. A vehicle windshield wiper assembly of the type comprising a flexible wiper blade supported in a pressure distributing flexible frame enclosed in a weather protective hood of flexible material characterized by:
    said pressure distributing frame including a primary yoke with means for connecting said yoke to a wiper arm;
    said hood having an inner wall, a pair of opposite side walls and an outer wall having an inside surface facing said primary yoke, said blade having a pair of longitudinal grooves in which the inner wall of said hood is received and sealed, said blade having a tapered tip;
    a first pair of electrical resistance conductors extending along, and fixed to, the inner wall of said hood, each proximate one of the opposite side walls of said wiper blade;
    a second pair of electrical resistance conductors, extending along and and affixed to, the outer wall of said hood, each proximate, one of the side walls thereof;
    said second pair of electrical resistance conductors being mounted between said inside surface of said outer wall of said hood and said primary yoke;
    said flexible wiper blade further including an electrical resistance conductor embedded within said blade proximate said tapered tip thereof;
    all of said electrical resistance conductors being connected to a male electrical plug and to a built-in electrical system including a vehicle battery for heating and melting ice simultaneously from both said hood and blade areas and from said distributing frame within said hood;
    an auxilliary power supply apparatus for providing electricity independent of said built-in vehicle electrical system;
    said auxilliary power supply apparatus comprising a portable enclosure of dimensions suitable for normal storage within the dash compartment of said vehicle and for mounting on the cowl outside said vehicle, said enclosure having a switch, a female electric plug socket on the exterior thereof and having at least one battery and an electric circuit therein including said battery, switch, and female plug socket;
    said female electric plug socket adapted to be connected with said male electric plug socket in order to provide electrical power to said electric resistance units without having to drain the electricity from said vehicle battery when the electrical energy is said vehicle battery is low.

2. A vehicle windshield wiper assembly as specified in claim 1 wherein:
    said enclosure includes a permanent magnet on the exterior thereof for temporarily affixing said enclosure to said cowl of said vehicle.

* * * * *